(12) United States Patent
Umina

(10) Patent No.: US 7,247,979 B2
(45) Date of Patent: Jul. 24, 2007

(54) DEVICE AND APPARATUS FOR HOLDING A TRANSDUCER

(75) Inventor: John A. Umina, Waltham, MA (US)

(73) Assignee: GE Security, Inc., Austin, TX (US)

( * ) Notice: Subject to any disclaimer, the term of this patent is extended or adjusted under 35 U.S.C. 154(b) by 27 days.

(21) Appl. No.: 11/269,038

(22) Filed: Nov. 7, 2005

(65) Prior Publication Data

US 2007/0103035 A1    May 10, 2007

(51) Int. Cl.
*H01L 41/053* (2006.01)

(52) U.S. Cl. .................... 310/348; 310/311; 73/866.5

(58) Field of Classification Search ............. 310/311, 310/348; 73/866.5
See application file for complete search history.

(56) References Cited

U.S. PATENT DOCUMENTS

| | | | |
|---|---|---|---|
| 2,496,293 A * | 2/1950 | Kiernan ................. | 310/348 |
| 4,649,754 A * | 3/1987 | Zacharias ............... | 73/861.18 |
| 4,970,907 A * | 11/1990 | Flynn .................... | 73/866.5 |
| 2003/0200812 A1* | 10/2003 | Kuhn et al. ............. | 73/715 |
| 2004/0050168 A1* | 3/2004 | Uberreiter .............. | 73/706 |

FOREIGN PATENT DOCUMENTS

| | | |
|---|---|---|
| DE | 35 08 570 A1 | 9/1985 |
| EP | 0 408 148 A | 1/1991 |
| GB | 2 134 655 A | 8/1984 |
| WO | 97/48578 A | 12/1997 |
| WO | WO 2004/090480 A2 | 10/2004 |

OTHER PUBLICATIONS

SAE International, "Surface Vehicle Standard", SAE J548-1; Rev Mar. 2000.
Foreign Search Report, Reference 176571/11892, Application No./Patent No. 06255639.4 - 1236, Feb. 15, 2007.

* cited by examiner

*Primary Examiner*—Thomas M. Dougherty
(74) *Attorney, Agent, or Firm*—Cantor Colburn LLP

(57) ABSTRACT

A holder for a transducer having a mounting portion, a coupler, and a clamping portion is disclosed. The mounting portion has a through hole with a conical seat disposed therein, with at least a portion of the through hole being configured to receive the transducer. The coupler is secured to the transducer and has a first interface surface configured to sit on the conical seat, and a second interface surface disposed on an opposite side to that of the first interface surface. The clamping portion has a through hole and a clamping surface, at least a portion of the through hole is configured to receive the transducer, and the clamping surface is configured to press against the second interface surface of the coupler. The clamping portion and mounting portion are configured to securely capture the coupler therebetween, thereby securely positioning the transducer relative to the mounting portion.

17 Claims, 3 Drawing Sheets

FIG. 1
FIG. 2
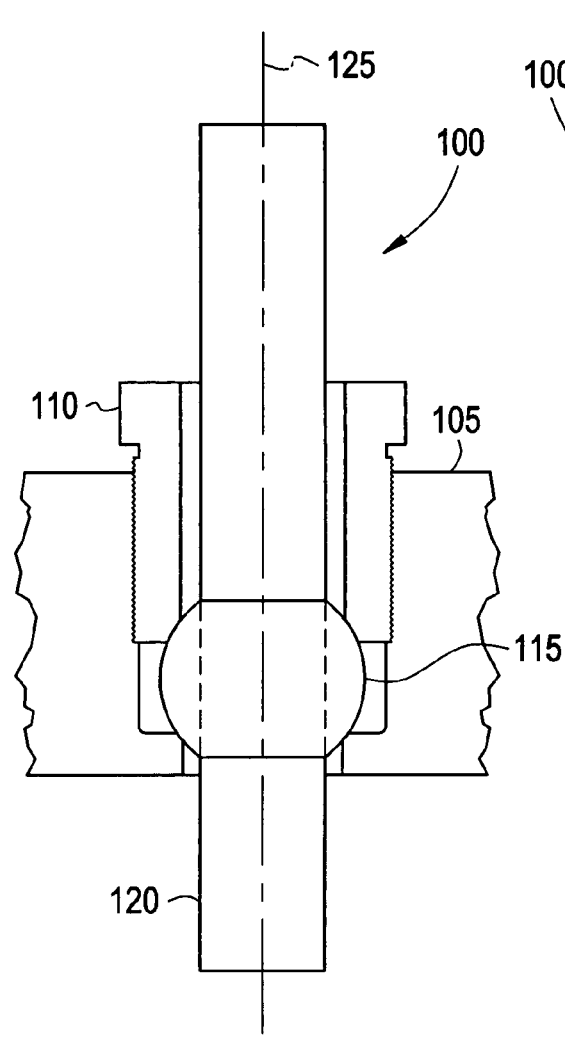
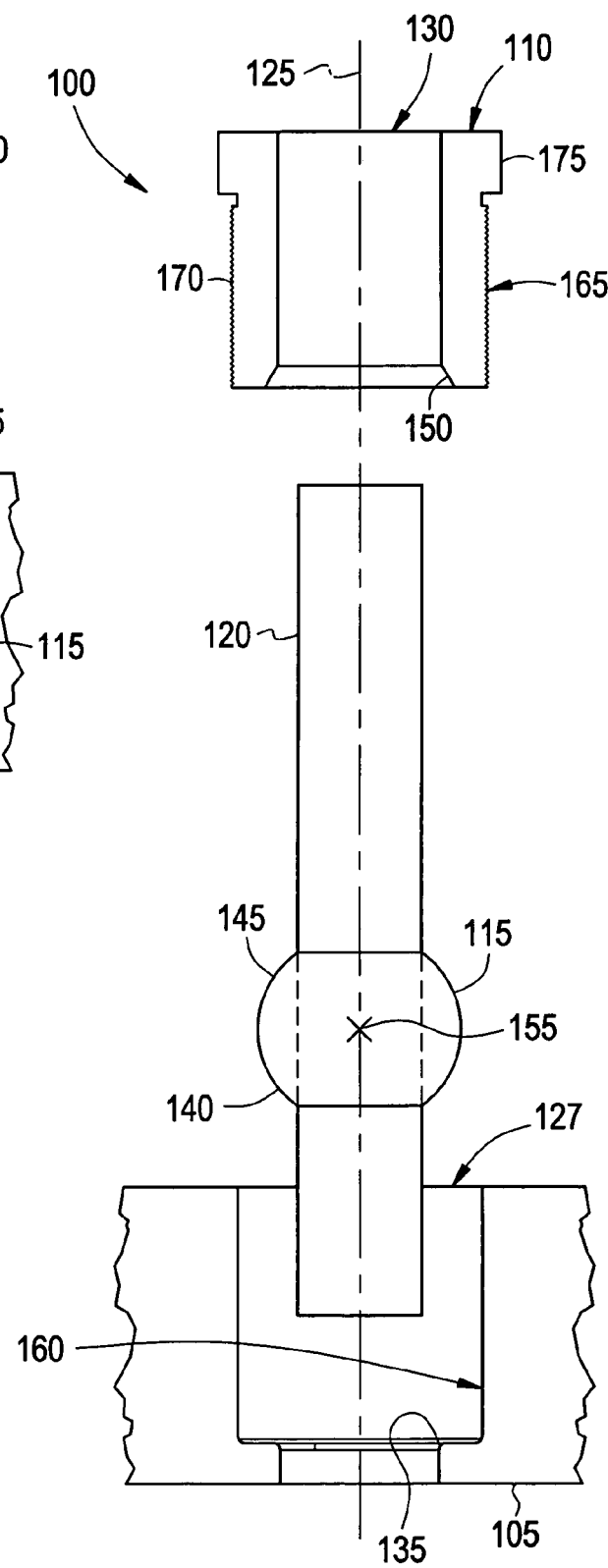

ically actuated signal source, typically a piezoelectric crystal, mounted in a mounting assembly fixed to a housing or wedge, or fixed directly to a conduit, to propagate ultrasonic signals through a medium flowing in the conduit. In applications where the medium has a low density, such as a gaseous medium, or where the size of the conduit or the signal path length through the medium raises considerations of crosstalk, the amount of signal energy that can be received through the medium is relatively small. Furthermore, because the signal propagates through the gas with a velocity different from and generally slower than its propagation velocity through the solid structure of the conduit, it can be difficult to find a suitable timing window in which the received signal can be dependably distinguished from ringing or other energy propagated directly through the conduit walls.

DEVICE AND APPARATUS FOR HOLDING A TRANSDUCER

BACKGROUND OF THE INVENTION

The present disclosure relates generally to transducers, and particularly to transducer holders.

Ultrasonic transducers are used in measurement systems that employ an electrically actuated signal source, typically a piezoelectric crystal, mounted in a mounting assembly fixed to a housing or wedge, or fixed directly to a conduit, to propagate ultrasonic signals through a medium flowing in the conduit. In applications where the medium has a low density, such as a gaseous medium, or where the size of the conduit or the signal path length through the medium raises considerations of crosstalk, the amount of signal energy that can be received through the medium is relatively small. Furthermore, because the signal propagates through the gas with a velocity different from and generally slower than its propagation velocity through the solid structure of the conduit, it can be difficult to find a suitable timing window in which the received signal can be dependably distinguished from ringing or other energy propagated directly through the conduit walls.

To some extent the problem of signal strength may be addressed by appropriate impedance matching and the use of a large-area diaphragm to couple the crystal to the medium. However, accurate transducer alignment remains a key factor in signal strength reception, which is problematic for rigidly secured transducers that are out of alignment.

One of the largest and most costly problems to deal with in wetted ultrasonic flow metering is the question of transducer alignment. The problem typically arises during the manufacturing process of any wetted flow meter. Or, the problem may be rooted in the alignment of the mounting holes on the pipe (which are often far apart and on opposite sides of the pipe), the tolerances for each part in the holding mechanism, the tolerances in the transducers, and the crushing of gaskets used to retain the internal pipe pressures. When such alignment problems occur, the effects may be many and varied, effecting such things as turndown ratio, signal strength, jitter, and signal shape, for example. These effects may end up manifesting themselves as flow measurement inaccuracy, and may require many hours of work to correct. Other times, however, it may be determined that there is such a degree of misalignment that it is impossible to correct. Some solutions that have been considered in an attempt to address transducer misalignment include high precision machining of all parts involved, the use of quality control tools to reject a great quantity of out-of-alignment flowcells and other critical components, and redundant assembly checks, all of which being costly to implement.

Accordingly, there is a need in the art for an ultrasonic transducer holder that addresses problems associated with transducer misalignment.

BRIEF DESCRIPTION OF THE INVENTION

An embodiment of the invention includes a holder for a transducer having a mounting portion, a coupler, and a clamping portion. The mounting portion has a through hole with a conical seat disposed therein, with at least a portion of the through hole being configured to receive the transducer. The coupler is secured to the transducer and has a first interface surface configured to sit on the conical seat, and a second interface surface disposed on an opposite side to that of the first interface surface. The clamping portion has a through hole and a clamping surface, at least a portion of the through hole is configured to receive the transducer, and the clamping surface is configured to press against the second interface surface of the coupler. The clamping portion and mounting portion are configured to securely capture the coupler therebetween, thereby securely positioning the transducer relative to the mounting portion.

Another embodiment of the invention includes a coupler for a transducer, which is configured to be secured between a mounting portion and a clamping portion of a transducer holder. The mounting portion has a first through hole with a conical seat disposed therein, wherein at least a portion of the first through hole is configured to receive the transducer. The clamping portion has a second through hole and a clamping surface, wherein at least a portion of the second through hole is configured to receive the transducer. The coupler has a central axis and includes a first interface surface, a second interface surface, and a third through hole. The first interface surface is arranged about the central axis and is configured to sit on the conical seat. The second interface surface is arranged about the central axis and disposed on an opposite side to that of the first interface surface. The third through hole is disposed along the central axis and is configured to snugly receive the transducer. In response to the clamping surface of the clamping portion pressing against the second interface surface of the coupler, the first interface surface of the coupler is pressed against the conical seat of the mounting portion, thereby securely capturing the coupler and securely positioning the transducer relative to the mounting portion.

BRIEF DESCRIPTION OF THE DRAWINGS

Referring to the exemplary drawings wherein like elements are numbered alike in the accompanying Figures:

FIG. 1 depicts in cross-section view an exemplary transducer holder in accordance with an embodiment of the invention.

FIG. 2 depicts in cross-section view an exploded assembly view of the transducer holder of FIG. 1;

DETAILED DESCRIPTION OF THE INVENTION

Figure 3:
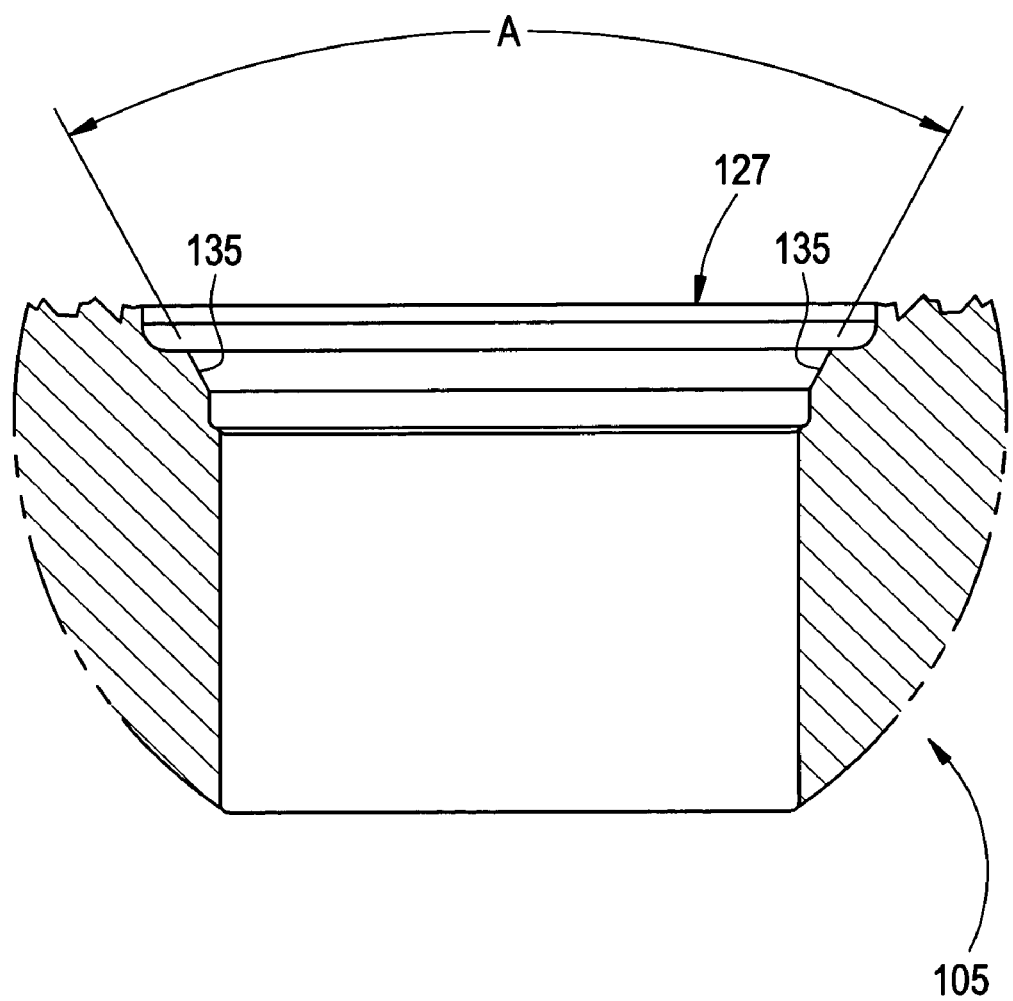
FIG. 3 depicts in cross-section view an expanded view of an area of the mounting portion in accordance with an embodiment of the invention.

An embodiment of the invention provides a holder for a transducer that includes three primary parts: a mounting portion, a clamping portion, and a coupler disposed between the mounting and clamping portions. The mounting portion may be a section of the pipe within which the flow is to be measured, or it may be a part separate from the pipe. The mounting portion has a through hole with a conical seat disposed therein and upon which the coupler is seated. The coupler has a through hole for snugly receiving the transducer. As used herein, the term snugly receiving is intended to refer to a snug fit between the coupler and the transducer such that in the assembled state the transducer is not easily dislodged with respect to the coupler. In the assembled and clamped state, which is discussed in more detail below, the coupler of an exemplary embodiment may act as a compression nut to provide a hermetic seal between the coupler and transducer. The clamping portion has a through hole for access to the transducer, and a clamping surface configured to press against the coupler, which in turn presses against the conical seat of the mounting portion. The clamping portion is configured to be securely fastened to the mounting portion. In an embodiment, the clamping portion and mounting portion pivotally capture the coupler therebetween in such a manner as to allow the coupler and transducer to be forcedly pivoted after attaching the clamping portion to the mounting portion, thereby allowing for adjustable aim of the transducer while providing a pressure boundary for securely positioning the transducer relative to the mounting portion.

Referring now to FIG. 1, an exemplary embodiment of a transducer holder 100 is depicted in cross-section view having a mounting portion 105, a clamping portion 110, and a coupler 115. Mounting portion 105 may be a section of a pipe in which the fluid flow to be measured is contained, or a separate mounting plate that is attached to the flow-containing pipe by a known means, such as a bolt or a weld for example. As illustrated, coupler 115 is securely fastened to a transducer 120, which may be accomplished by a friction fit, a press fit, welding, adhesive, or any other means suitable for the purposes disclosed herein. In an alternative embodiment, coupler 115 may be machined as part of the body of the transducer 120, rather than being attached to the transducer 120 at a later point in time in the assembly process. The illustrated axis 125 is herein referred to as a central axis in response to the axis of transducer 120 being oriented coincident with the axis of the through hole of mounting portion 105, which is best seen by now referring to the exploded assembly view of FIG. 2.

As illustrated in FIG. 2, mounting portion 105 includes a through hole 127, and clamping portion 110 includes a through hole 130. At least a portion of each through hole 127, 130 is configured to receive transducer 120. Disposed within through hole 127 of mounting portion 105 is a conical seat 135 (best seen by referring to the expanded view of FIG. 3), which is configured for receiving coupler 115. Coupler 115 includes a first interface surface 140 configured to sit on conical seat 135, and a second interface surface 145 disposed on an opposite side of coupler 115 to that of the first interface surface 140. Clamping portion 110 includes a clamping surface 150 configured to press against the second interface surface 145 of the coupler 115 when transducer holder 100 is in the assembled state, as illustrated in FIG. 1. In the assembled state, clamping portion 110 and mounting portion 105 are configured to securely capture the coupler 115 therebetween, thereby securely positioning the transducer 120 relative to the mounting portion 105.

In an embodiment, conical seat 135 of mounting portion 105 has and included angle of equal to or greater than 59 degrees and equal to or less than 60 degrees, as illustrated by angle A in FIG. 3.

In an embodiment, and as illustrated in FIG. 2, the first interface surface 140 of the coupler 115 may be spherical in shape, the second interface surface 145 of the coupler 115 may be spherical in shape, or both interface surfaces may be spherical in shape. In an embodiment where the second interface surface 145 is spherical in shape, the clamping surface 150 of clamping portion 110 is configured to be either conical in shape or spherical in shape.

In another embodiment, the spherical-shaped first and second interface surfaces 140, 145 of coupler 115 are configured to have the same axis of rotation 155, and as discussed previously, the clamping portion 110 and mounting portion 105 are configured to pivotally capture the coupler 115 therebetween, via conical seat 135 and clamping surface 150. As a result, coupler 115 and transducer 120 may be forcedly pivoted about the axis of rotation 155 after the clamping portion 110 is attached to the mounting portion 105, thereby allowing for adjustable aim of the transducer 120 while providing a pressure boundary at first and second interface surfaces 140, 145 for securely positioning the transducer 120 relative to the mounting portion 105. Upon final positioning of the transducer 120, clamping portion 110 may be further tightened with respect to mounting portion 105, thereby securely positioning the transducer 120 relative to the mounting portion 105.

In an embodiment, the through hole 127 of the mounting portion 105 includes internal threads 160, and an external surface 165 of the clamping portion 110 includes external threads 170, thereby allowing the clamping portion 110 to threadably engage with the mounting portion 105. However, alternative means of attaching clamping portion 110 to mounting portion 105 may also be employed and are also herein contemplated. For example, and in the absence of threads 160 and 170, external surface 165 may be sized to slidably fit into through hole 127, and a shoulder 175 of clamping portion 110 may be extended and equipped with through holes and mounting hardware, such as machine screws for example, that are configured to attach to threaded features, such as tapped holes for example, on mounting portion 105. While this alternative means of attaching clamping portion 110 to mounting portion 105 is not specifically illustrated, it is considered descriptive of a means well known in the art and requiring no further illustration.

Figure 4:
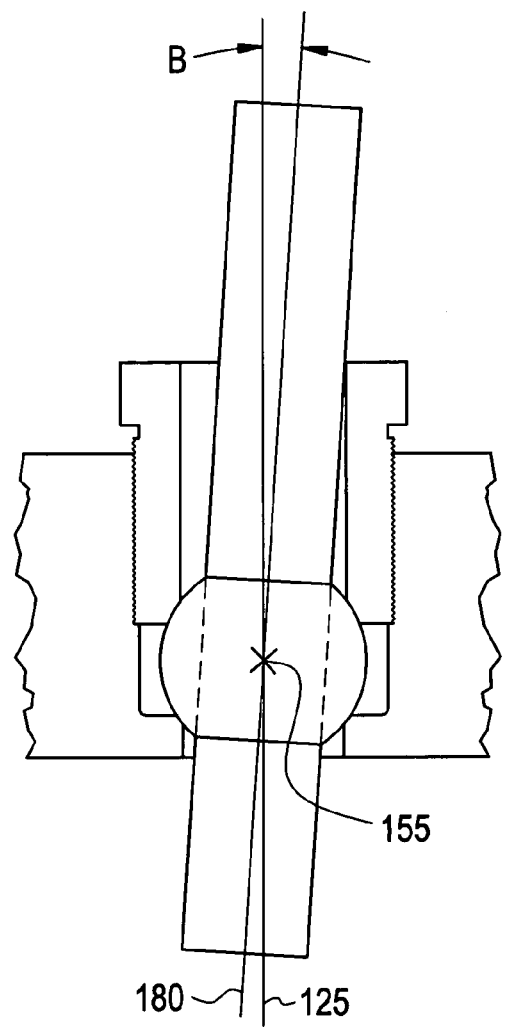
FIG. 4 depicts in cross-section view the transducer holder of FIG. 1 with the transducer in an alternative position in accordance with an embodiment of the invention.

As illustrated in FIG. 2, and further exemplified in FIG. 4, an embodiment may be configured such that the through hole 127 of mounting portion 105, and the through hole 130 of clamping portion 110, have internal diameters larger than the external diameter of the transducer 120, thereby allowing the coupler 115 and transducer 120 to be forcedly pivoted about the axis of rotation 155 to allow the transducer 120, having axis 180, to tilt from zero degrees to about three degrees relative to the central axis 125 of through hole 127, as illustrated by angle B in FIG. 4.

In an embodiment, the diameters of through hole 127, through hole 130, and transducer 120, are configured to produce a tilt angle B such that the target of the transducer 120 may be displaced about +/−0.25 inches from axis 180 at a distance of about 10 inches from the transducer 120.

Figure 5:
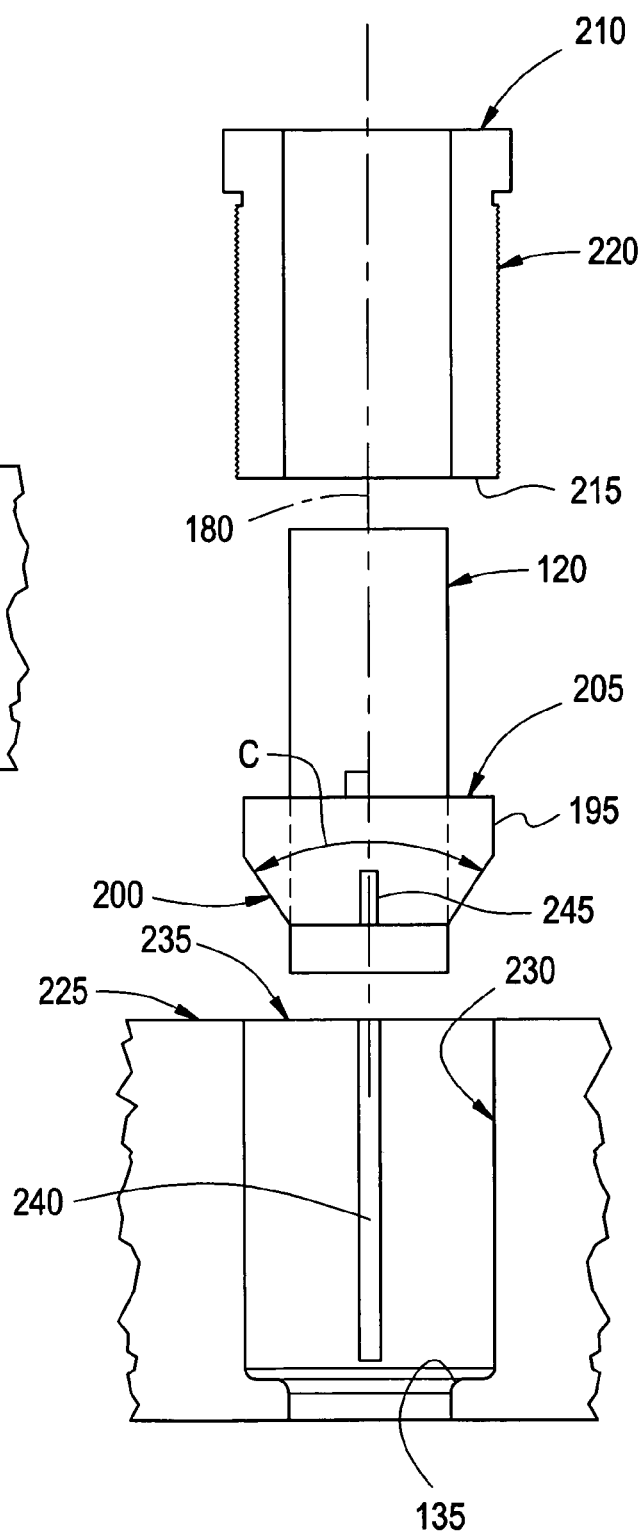
FIG. 5 depicts in cross-section view an alternative transducer holder to that of FIG. 1.

Referring now to FIG. 5, an alternative embodiment of holder 100 is depicted. Here, coupler 195 (similar to coupler 115) has a first interface surface 200 (similar to first interface surface 140) that is conical in shape, and a second interface surface 205 (similar to second interface surface 145) that is flat and oriented perpendicular to the axis 180 of the transducer 120. Also, clamping portion 210 (similar to clamping portion 110) has a clamping surface 215 (similar to clamping surface 150) that is flat and oriented parallel to the plane of second interface surface 205, thereby resulting in a downward force (relative to the view of FIG. 5) being exerted between clamping surface 215 and second interface surface 205 as clamping portion 210 is threadably engaged, via external threads 220, with mounting portion 225, via internal threads 230. As coupler 195 and transducer 120 are driven downwards, the conical-shaped first interface surface 200 is pressed against conical seat 135 of mounting portion 225, which is the same as the conical seat 135 depicted in FIG. 3. In an embodiment, the included angle C of conical-shaped first interface surface 200 is equal to or greater than 61 degrees and equal to or less than 65 degrees. By comparing the exemplary included angle C of conical-shaped first interface surface 200 with the exemplary included angle A of conical seat 135, it will be appreciated that as coupler 195 is driven downward against seat 135, a wedging and sealing action occurs therebetween.

In an alternative embodiment, other included angles may be employed for angle A and angle C. However, to provide for a wedging and sealing action in the absence of a gasket, it is desirable for the included angle C of the conical-shaped first interface surface 200 of the coupler 195 to have a greater value that the included angle A of the conical seat 135 of the mounting portion 225.

In another embodiment, and with reference still to FIG. 5, through hole 235 of mounting portion 225 may include a key slot 240 that is configured to a receive key projection 245 of coupler 195, thereby preventing rotation of coupler 195 and transducer 120 as clamping portion 210 is rotationally attached to mounting portion 225 via threads 220 and 230. While key slot 240 and key projection 245 are described and illustrated being associated with defined parts, it will be appreciated that an opposite association may also be employed.

As disclosed, some embodiments of the invention may include some of the following advantages: a gasketless seal between the mounting portion and coupler, and between the coupler and transducer, for applications employing a wetted transducer; repeatable insertion depth of the transducer in the holder assembly by virtue of the ability to precisely position the coupler on the transducer; the ability to aim the transducer during and after installation into the holder, thereby alleviating the troublesome problem of having a misaligned transducer; the ability to construct flowcells with less stringent requirements on alignment, thereby reducing the cost of the flowcell itself; the ability to retrofit existing transducers with improved alignment capability; the ability to intentionally misalign transducers, which allows for beam drift compensation; a wetted transducer holder having high location accuracy, repeatable transducer positioning, and low cost, that allows for adjustable aim of the transducer while providing a pressure boundary; and, repeatable location accuracy to within +/−0.001 inches or better.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A holder for a transducer, comprising:
a mounting portion having a through hole with a conical seat disposed therein, at least a portion of the through hole configured to receive the transducer;
a coupler secured to the transducer, the coupler having a first interface surface configured to sit on the conical seat, and a second interface surface disposed on an opposite side to that of the first interface surface; and
a clamping portion having a through hole and a clamping surface, at least a portion of the through hole configured to receive the transducer, the clamping surface configured to press against the second interface surface of the coupler;
wherein the clamping portion and mounting portion are configured to securely capture the coupler therebetween, thereby securely positioning the transducer relative to the mounting portion.

2. The holder of claim 1, wherein:
the first interface surface of the coupler is conical in shape.

3. The holder of claim 2, wherein:
the included angle of the conical seat of the mounting portion has a first value; and
the included angle of the conical-shaped first interface surface of the coupler has a second value greater than the first value.

4. The holder of claim 2, wherein:
the included angle of the conical seat of the mounting portion is equal to or greater than 59 degrees and equal to or less than 60 degrees; and
the included angle of the conical-shaped first interface surface of the coupler is equal to or greater than 61 degrees and equal to or less than 65 degrees.

5. The holder of claim 1, wherein:
the second interface surface of the coupler is flat and oriented perpendicular to a central axis of the transducer.

6. The holder of claim 2, wherein:
the second interface surface of the coupler is flat and oriented perpendicular to a central axis of the transducer.

7. The holder of claim 1, wherein:
the first interface surface of the coupler is spherical in shape.

8. The holder of claim 1, wherein:
the second interface surface of the coupler is spherical in shape.

9. The holder of claim 7, wherein:
the second interface surface of the coupler is spherical in shape.

10. The holder of claim 9, wherein:
the clamping surface of the clamping portion is conical in shape.

11. The holder of claim 1, wherein:
the through hole of the mounting portion comprises internal threads, and an external surface of the clamping portion comprises external threads, thereby allowing the clamping portion to threadably engage with the mounting portion.

12. The holder of claim 3, wherein:
the clamping portion and mounting portion are configured to securely capture the coupler therebetween in a manner that wedges the conical-shaped first interface surface of the coupler against the conical seat of the mounting portion.

13. The holder of claim 10, wherein:

the spherical-shaped first and second surfaces of the coupler have the same axis of rotation; and the clamping portion and mounting portion are configured to pivotally capture the coupler therebetween in a manner that allows the coupler and transducer to be forcedly pivoted about the axis of rotation after attaching the clamping portion to the mounting portion, thereby allowing for adjustable aim of the transducer while providing a pressure boundary for securely positioning the transducer relative to the mounting portion.

14. The holder of claim 13, wherein:

the through hole of the mounting portion, and the through hole of the clamping portion, are sized relative to the transducer to allow the coupler and transducer to be forcedly pivoted about the axis of rotation to allow the transducer to tilt from zero degrees to about three degrees relative to a central axis.

15. The holder of claim 1, wherein:

the coupler comprises a first key structure and the mounting portion comprises a second key structure, such that the first key structure engages with the second key structure to prevent rotational displacement of the coupler and transducer relative to the mounting portion.

16. A coupler for a transducer, the coupler configured to be secured between a mounting portion and a clamping portion of a transducer holder, the mounting portion having a first through hole with a conical seat disposed therein, at least a portion of the first through hole configured to receive the transducer, the clamping portion having a second through hole and a clamping surface, at least a portion of the second through hole configured to receive the transducer, the coupler having a central axis and comprising:

a first interface surface arranged about the central axis and configured to sit on the conical seat;

a second interface surface arranged about the central axis and disposed on an opposite side to that of the first interface surface; and a third through hole disposed along the central axis and configured to snugly receive the transducer;

wherein in response to the clamping surface of the clamping portion pressing against the second interface surface of the coupler, the first interface surface of the coupler is pressed against the conical seat of the mounting portion, thereby securely capturing the coupler and securely positioning the transducer relative to the mounting portion.

17. The coupler of claim 16, wherein:

the first and second interface surfaces of the coupler are spherical in shape with the same axis of rotation, thereby allowing the clamping portion and mounting portion to pivotally capture the coupler therebetween in a manner that allows the coupler and transducer to be forcedly pivoted about the axis of rotation after attaching the clamping portion to the mounting portion, thereby allowing for adjustable aim of the transducer while providing a pressure boundary for securely positioning the transducer relative to the mounting portion.

* * * * *